F. A. EUSTIS.
METHOD AND APPARATUS FOR SEGREGATING AND RECOVERING GASES.
APPLICATION FILED DEC. 19, 1917.

1,265,892.

Patented May 14, 1918.
2 SHEETS—SHEET 1.

F. A. EUSTIS.
METHOD AND APPARATUS FOR SEGREGATING AND RECOVERING GASES.
APPLICATION FILED DEC. 19, 1917.

1,265,892.

Patented May 14, 1918.
2 SHEETS—SHEET 2.

Inventor:
Frederic A. Eustis,
by Roberts Roberts & Cushman
his Attorneys.

UNITED STATES PATENT OFFICE.

FREDERIC AUGUSTUS EUSTIS, OF MILTON, MASSACHUSETTS.

METHOD AND APPARATUS FOR SEGREGATING AND RECOVERING GASES.

1,265,892.  Specification of Letters Patent.  Patented May 14, 1918.

Application filed December 19, 1917. Serial No. 207,953.

*To all whom it may concern:*

Be it known that I, FREDERIC A. EUSTIS, a citizen of the United States of America, and resident of Milton, in the county of Norfolk and State of Massachusetts, have invented new and useful Improvements in Methods and Apparatus for Segregating and Recovering Gases, of which the following is a specification.

This invention relates to a method or process of segregating and recovering gases from others with which they may be associated, and to apparatus for performing such process, and comprises certain improvements upon and modifications of the method and apparatus set forth in applications for Letters Patent of the United States filed by Utley Wedge and myself May 29, 1915, Serial No. 31,208 for recovery of $SO_2$ or the like from gases containing the same, and July 10, 1915, Serial No. 39,099 for apparatus for segregating and recovering gases.

In the accompanying drawings which illustrate apparatus containing my invention, and suitable for performing my process,—

Figure 1:
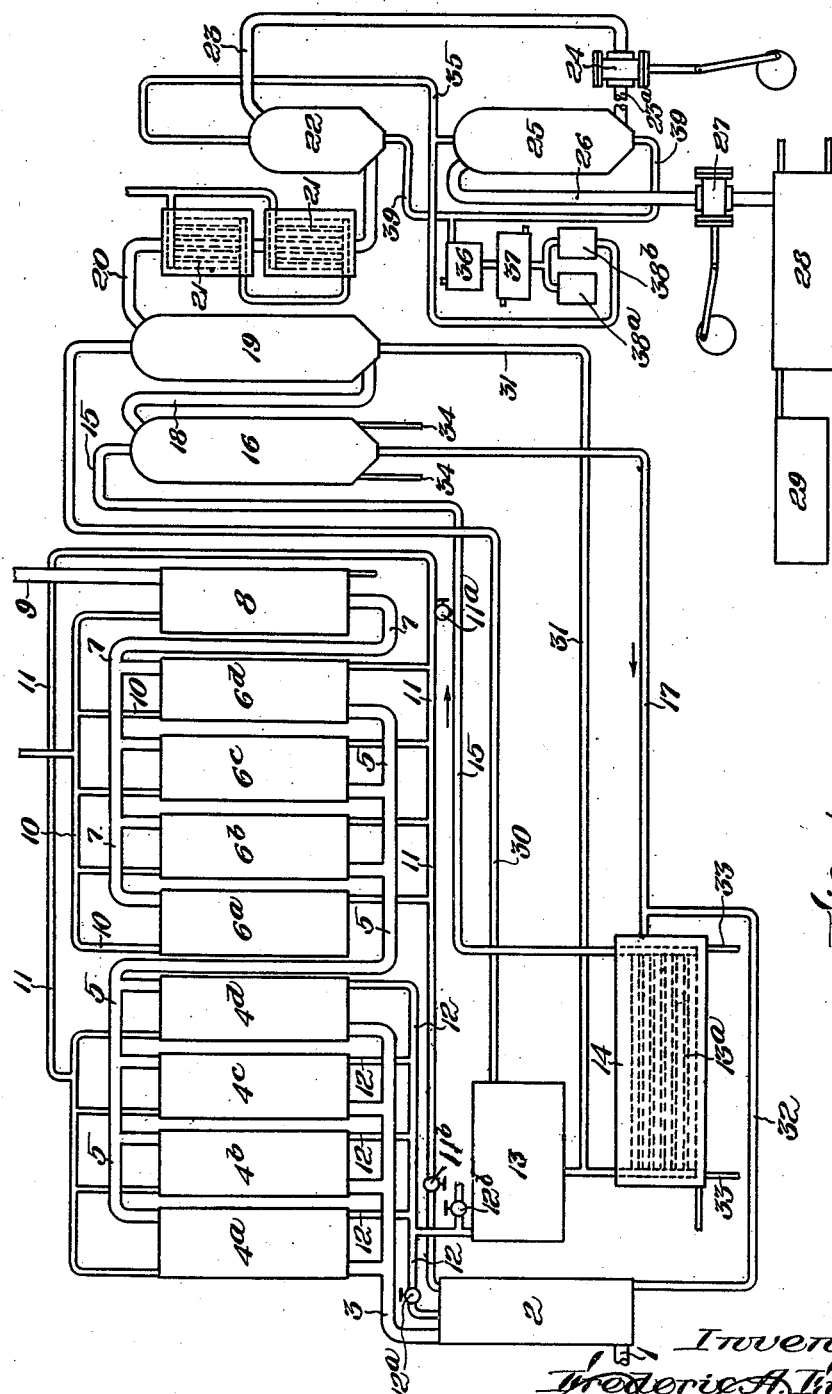
Figure 1 represents, in diagrammatic form, such apparatus as a whole.

The process as a whole, stated in brief, general terms, comprises bringing the furnace gases, previously cooled, into contact with liquid which will absorb $SO_2$. The $SO_2$ is then driven off or extracted from the liquid in an extractor by means of the combined effect of heat and vacuum, and while still under vacuum the $SO_2$ is deprived of any water vapor which it may contain and the dry gas is then compressed, cooled and liquefied if desired.

The present invention has to do mainly with the cooling and drying of the $SO_2$ gases after their extraction, with the utilization of the heat derived from the extracted $SO_2$ gas for heating part of the solution from which the $SO_2$ is to be extracted, and with other features of apparatus and the process steps hereinafter more fully described and particularly pointed out in the claims.

Gases from the furnace, smelter, or the like are led through flue 1 into the hot tower 2, the principal function of which is to cool and clean the gases, and to store the heat for utilization as hereinafter explained. From tower 2 the gases pass through pipe or flue 3 into scrubbing towers $4^a$, $4^b$, $4^c$, $4^d$, in parallel; thence by pipe or flue 5 into scrubbing towers $6^a$, $6^b$, $6^c$, $6^d$, in parallel; thence by pipe or flue 7 into the lime tower 8; and thence by pipe or flue 9 to a stack or the atmosphere. The hot tower 2, the scrubbing towers $4^a$, etc., (which may be termed the 4-group) the scrubbing towers $6^a$, etc., (which may be termed the 6-group), and the tower 8 may all be substantially similar, and are packed with masses of broken, solid material in such form that water or liquid descending through the towers will be broken up to present extended superficial areas for contact with the gases from the furnace. The material with which the towers are packed may be coke, slag or other insoluble material, or limestone or other soluble material which will increase the capacity of the liquid for absorbing $SO_2$, or the packing may be in part such insoluble material, and in part such soluble material. Preferably the hot tower 2, and the scrubbing towers of the 4-group and the 6-group, will be packed with coke or other insoluble material, while the tower 8 will be packed with limestone, or some similar soluble material, to increase the capacity of the liquid to absorb $SO_2$, and thus remove as nearly as possible the last trace of $SO_2$ from the gases.

Water is fed to the scrubbing towers of the 6-group and to tower 8 from any suitable source of supply through pipe 10, whence it is delivered in parallel to headers or distributers at the tops of the several towers, and from the distributer flows or trickles down through the packing. The water from tower 8 flows to waste. The water from the towers of the 6-group is collected in pipe 11, and may be disposed of in three ways. Part of it may be delivered through valve $11^b$ into the top of the hot tower 2, where it will become heated by the incoming hot furnace gases and give up its sulfur dioxid gas thereby enriching the furnace gases which pass to the scrubbers of the 4-group; part of the water will be carried by pipe 11 and delivered into the tops of the scrubbers of the 4-group, through the several towers of which it passes in parallel;

and part will probably always be wasted to the sewer through valve 11ª.

It will be observed that both the liquids and the gases pass through the individual towers of each group in parallel, and through the groups in series. The water first passing through the scrubbers of the 6-group takes up sulfur dioxid gas which still remains in the furnace gases after their passage through the scrubbers of the 4-group, and is then further enriched as it passes through the scrubbers of the 4-group. The solution from the 4-group is collected in pipe 12, and part of it may be delivered through valve 12ª into the hot tower 2, where the solution will become heated and give up its gas, thereby further enriching the gas which flows to the scrubbers of the 4-group. Whether the solutions from the 4-group or the 6-group, or either of them, are delivered into the hot tower, will be determined by the operative conditions of the particular plant and the analyses of the solutions as they may be found; and such delivery may be controlled by the valves 11ᵇ and 12ª. The conditions will vary with different supplies of gas, and probably from hour to hour with the same supply of gas. The remainder of the solution from the scrubbers of the 4-group will be delivered into a storage tank 13, or wasted through valve 12ᵇ if the supply exceeds the capacity of the subsequent parts of the apparatus to take care of it.

Figure 2:
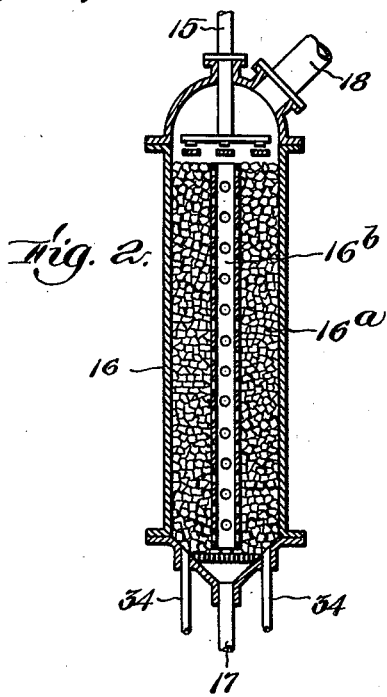
Fig. 2 is a sectional view, on an enlarged scale, of the extractor.

From the storage tank 13, which is covered to prevent the escape of $SO_2$ gas, parts of the solutions flow to coil 13ª of heat exchanger 14, where they become heated by the hot liquors supplied to the tank of the heat exchanger, as hereinafter described, and thence flow, aided by a pump, if necessary, through pipe 15 to the top of the vacuum extractor 16. In extractor 16, the solutions are subjected to a partial vacuum as they flow from a suitable distributer over a mass of packing 16ª (Fig. 2) contained in the extractor 16 and surrounding a central perforated pipe 16ᵇ therein. As the combined result of heat and vacuum, the $SO_2$ gas is extracted from the solution, collected in the perforated pipe 16ᵇ, and passes out through pipe or flue 18. After the gases have been extracted the liquor flows from the bottom of the extractor by pipe 17 to the vessel of the heat exchanger 14 and gives up its heat to fresh solutions entering from the storage tank 13, afterward flowing to waste.

Figure 3:
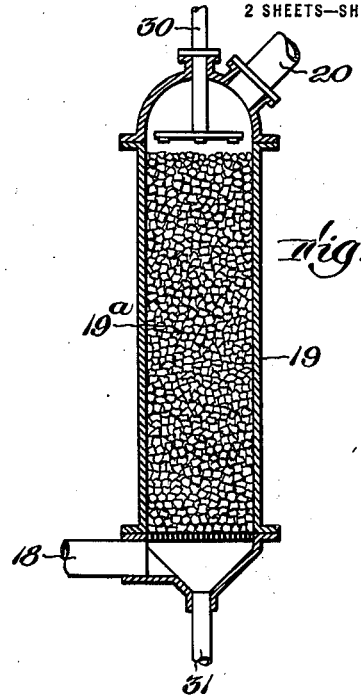
Fig. 3 is a sectional view, on an enlarged scale, of the douche tank.

The $SO_2$ gases extracted in the extractor 16 flow by pipe 18 to the bottom of a douche tank 19, which is substantially similar to the extractor 16, except for the central perforated pipe. The gas entering at the bottom of the douche tank rises through the packing 19ª (Fig. 3) in contact with solution delivered at the top of the douche tank. The gas is thus cooled, and considerable of the contained water vapor is precipitated out, while the solution is somewhat warmed.

From the top of douche tank 19 the gases go by pipe 20 to refrigerating traps 21, 21, where they are further cooled by brine or other suitable agencies, refrigerated by an ammonia plant or the like, and a still further part of their contained water vapor is given up. Any other suitable means may be used for cooling.

Figure 4:
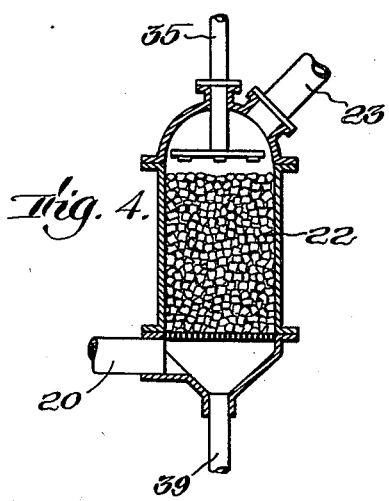
Fig. 4 is a sectional view, on an enlarged scale, of the sulfuric acid desiccator.

From the refrigerating traps 21, the gases flow to a sulfuric acid desiccator 22 where they are exposed to sulfuric acid and more of the water is taken out. The sulfuric acid desiccator 22 (Fig. 4) is substantially similar to the douche tank 19, only smaller.

The gases then flow through pipe 23 to vacuum pump 24, by which the vacuum is maintained in extractor 16, douche tank 19, refrigerator traps 21 and desiccator 22.

From the vacuum pump 24 the gases flow through pipe 23ª to a second sulfuric acid desiccator 25, for finally removing the water vapor, and thence through pipe 26 to a compressor 27. A cooler may be arranged in pipe 23ª according to the usual practice to increase the efficiency of desiccator 25, and to some extent to save power in pump 27 by reducing the volume of gas to be handled. The gases are compressed by 27 to a condensable pressure and then flow to a condenser 28, cooled by brine, or other agency, where they become liquefied as the combined result of the pressure and low temperature. The liquefied gas is stored in a container 29.

The douche tank 19 is supplied with cold solution by pipe 30 (in which a pump may be used if necessary) leading from storage tank 13 to the top of the douche tank. After the solution has passed through the douche tank, where it is somewhat warmed, it passes by pipe 31 to coil 13ª of the heat exchanger without again passing through the storage tank 13.

The heat exchanger 14 is fed with hot liquid from the hot tower 2 through pipe 32. Additional heat may be supplied to the heat exchanger by steam through pipes 33, 33, either blowing directly into the solutions, or connected to steam coils, in case sufficient heat does not develop from other parts of the system, or for the purpose of starting up.

The solutions entering the extractor 16 through pipe 15, come hot from the heat exchanger, but in case additional heat is required to facilitate the extraction of the gases from the liquors, heat may be introduced into the extractor 16 through steam pipes 34, 34, either through coils or by blowing directly into the extractor.

Figure 5:
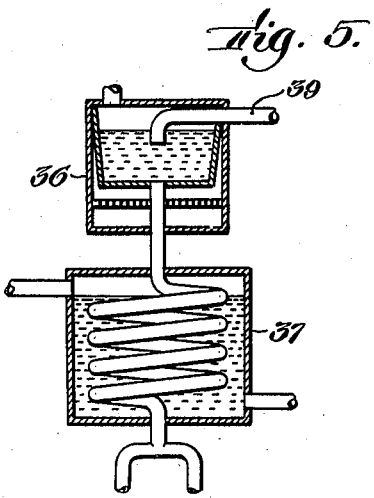
Fig. 5 is a sectional view, on an enlarged scale, of the sulfuric acid concentrator and cooling tank.

Sulfuric acid, or some liquid agent having an affinity for water vapor, is supplied to the desiccators 22 and 25 through pipe 35, and is collected from the desiccators in pipe 39. Pipe 39 discharges into a concentrator 36, (see Fig. 5) where the acid is heated to drive off the accumulated water. The acid flows from concentrator 36 to a cooling tank 37, where it is cooled by water, or other agencies, and then to the "acid eggs," so-called, $38^a$ and $38^b$, which are pressure tanks adapted to force the acid back through pipe 35 to the desiccators 22 and 25.

The extractor as here shown is designed for continuous operation.

The cooling apparatus, 19 and 21, inserted between the extractor 16 and the desiccator 22, has a double purpose. It reduces the volume of gas to be handled, and it greatly assists in the drying of the gas, the last stage of which is carried on in the sulfuric acid desiccators. Also the arrangement of the douche tank possesses the advantage not only that it cools the gas but also that the liquid used for that purpose is in part the very solution from which subsequently the $SO_2$ is extracted in extractor 16, so that the heat imparted by the warm gas to the solution in the douche tank is utilized to warm the solution going to the extractor.

I claim:

1. The method of recovering $SO_2$ or the like from furnace or other gases containing the same, comprising causing a liquid to absorb $SO_2$ from said gases, thereafter extracting the $SO_2$ from the liquid solution by subjecting the solution to the combined effect of heat and vacuum, and thereafter subjecting the extracted $SO_2$ gas to a cooling agency to deprive it of water vapor with which it may still be associated.

2. The method of recovering $SO_2$ or the like from furnace or other gases containing the same, comprising causing a liquid to absorb $SO_2$ from said gases, thereafter extracting the $SO_2$ from the liquid solution by subjecting the solution to the combined effect of heat and vacuum, and thereafter while still under vacuum subjecting the extracted $SO_2$ gas to a cooling agency to deprive it of water vapor with which it may still be associated.

3. The method of recovering $SO_2$ or the like from furnace or other gases containing the same, comprising causing a liquid to absorb $SO_2$ from said gases, thereafter extracting the $SO_2$ from the liquid solution by subjecting the solution to the combined effect of heat and vacuum, and thereafter bringing the extracted $SO_2$ gas into contact with a cool liquid to deprive it of water vapor with which it may still be associated.

4. The method of recovering $SO_2$ or the like from furnace or other gases containing the same, comprising causing a liquid to absorb $SO_2$ from said gases, thereafter extracting the $SO_2$ from the liquid solution by subjecting the solution to the combined effect of heat and vacuum, and thereafter while still under vacuum bringing the extracted $SO_2$ gas into contact with a cool liquid to deprive it of water vapor with which it may still be associated.

5. The method of recovering $SO_2$ or the like from furnace or other gases containing the same, comprising causing a liquid to absorb $SO_2$ from said gases, thereafter extracting the $SO_2$ from the liquid solution by subjecting the solution to the combined effect of heat and vacuum, and thereafter bringing the extracted $SO_2$ gas into contact with a cooling agency and also with separate refrigerating means, to deprive it of water vapor with which it may still be associated.

6. The method of recovering $SO_2$ or the like from furnace or other gases containing the same, comprising causing a liquid to absorb $SO_2$ from said gases, thereafter extracting the $SO_2$ from the liquid solution by subjecting the solution to the combined effect of heat and vacuum, and thereafter while still under vacuum bringing the extracted $SO_2$ gas into contact with a cool liquid and also with refrigerating means to deprive it of water vapor with which it may still be associated.

7. The method of recovering $SO_2$ or the like from furnace or other gases containing the same, comprising causing a liquid to absorb $SO_2$ from said gases, thereafter extracting the $SO_2$ from the liquid solution by subjecting the solution to the combined effect of heat and vacuum, and thereafter both subjecting the extracted $SO_2$ gas to a cooling agency to deprive it of part of the water vapor with which it may still be associated, and also bringing the gas into contact with a liquid agent having an affinity for water vapor.

8. The method of recovering $SO_2$ or the like from furnace or other gases containing the same, comprising causing a liquid to absorb $SO_2$ from said gases, thereafter extracting the $SO_2$ from the liquid solution by subjecting the solution to the combined effect of heat and vacuum, and thereafter while still under vacuum, both subjecting the extracted $SO_2$ gas to a cooling agency to deprive it of part of the water vapor with which it may still be associated, and also bringing the gas into contact with a liquid agent having an affinity for water vapor.

9. The method of recovering $SO_2$ or the like from furnace or other gases containing the same, comprising causing a liquid to absorb $SO_2$ from said gases, thereafter extracting the $SO_2$ from the liquid solution by subjecting the solution to the combined effect of heat and vacuum, and thereafter bringing the extracted $SO_2$ gas into contact with a cool liquid, then into contact with refrigerating means, and then into contact with a liquid agent having an affinity for water vapor, to deprive the gas of water vapor with which it may still be associated.

10. The method of recovering $SO_2$ or the like from furnace or other gases containing the same, comprising causing a liquid to absorb $SO_2$ from said gases, thereafter extracting the $SO_2$ from the liquid solution by subjecting the solution to the combined effect of heat and vacuum, and thereafter while still under vacuum bringing the extracted $SO_2$ gas into contact with a cool liquid, then into contact with refrigerating means, and then into contact with a liquid agent having an affinity for water vapor to deprive the gas of water vapor with which it may still be associated.

11. The method of recovering $SO_2$ or the like from furnace or other gases containing the same, comprising causing a liquid to absorb $SO_2$ from said gases, thereafter extracting the $SO_2$ from the liquid solution by subjecting the solution to the combined effect of heat and vacuum, and utilizing the heat of the extracted $SO_2$ gas to warm the solution from which the $SO_2$ is to be extracted.

12. The method of recovering $SO_2$ or the like from furnace or other gases containing the same, comprising causing a liquid to absorb $SO_2$ from said gases, thereafter extracting the $SO_2$ from the liquid solution by subjecting the solution to the combined effect of heat and vacuum, and bringing a part of said solution before the $SO_2$ is extracted, into contact with the hot extracted $SO_2$ gas while still under vacuum to cool the gas and warm the solution.

13. Apparatus for segregating and recovering gases from other gases associated therewith, comprising in combination means for subjecting the associated gases to contact with a liquid whereby the gas to be recovered will be absorbed from other gases, a vacuum extractor, means for conveying the liquid from the absorber to the extractor, means to heat the liquid after it leaves the absorber and before it leaves the vacuum extractor, means to maintain a partial vacuum in said extractor, and cooling apparatus to which the gas from the extractor passes, said cooling apparatus being adapted to cool the gas and precipitate moisture therefrom.

14. Apparatus for segregating and recovering gases from other gases associated therewith, comprising in combination means for subjecting the associated gases to contact with a liquid whereby the gas to be recovered will be absorbed from other gases, a vacuum extractor, means for conveying the liquid from the absorber to the extractor, means to heat the liquid after it leaves the absorber and before it leaves the vacuum extractor, and cooling apparatus to which the gas from the extractor passes, said cooling apparatus being adapted to cool the gas and precipitate moisture therefrom, and means for conveying the gas from the extractor through the cooling apparatus under less than atmospheric pressure.

15. Apparatus for segregating and recovering gases from other gases associated therewith, comprising in combination means for subjecting the associated gases to contact with a liquid whereby the gas to be recovered will be absorbed from other gases, a vacuum extractor, means for conveying the liquid from the absorber to the extractor, means to heat the liquid after it leaves the absorber and before it leaves the vacuum extractor, cooling apparatus to which the gas from the extractor passes, said cooling apparatus being adapted to cool the gas and precipitate moisture therefrom, a desiccator including a supply of a liquid agent having an affinity for water vapor, and means for conveying the gas from the extractor through the cooling apparatus and the desiccator under less than atmospheric pressure.

16. Apparatus for segregating and recovering gases from other gases associated therewith, comprising in combination means for subjecting the associated gases to contact with a liquid whereby the gas to be recovered will be absorbed from other gases, a vacuum extractor, means for conveying liquid from the absorber to the extractor, means to heat the liquid after it leaves the absorber and before it leaves the vacuum extractor, means to maintain a partial vacuum in said extractor, a douche tank to which gas from the extractor passes, and means to supply liquid to the douche tank to cool the gas and precipitate moisture therefrom.

17. Apparatus for segregating and recovering gases from other gases associated therewith, comprising in combination means for subjecting the associated gases to contact with a liquid whereby the gas to be recovered will be absorbed from other gases, a vacuum extractor, means for conveying the liquid from the absorber to the extractor, means to heat the liquid after it leaves the absorber and before it leaves the vacuum extractor, means to maintain a partial vacuum in said extractor, a douche tank to which gas from the extractor passes, and means to convey part of the solution from the absorbers to the douche tank to cool the gas and precipitate moisture therefrom.

18. Apparatus for segregating and recovering gases from other gases associated therewith, comprising in combination means for subjecting the associated gases to contact with a liquid whereby the gas to be recovered will be absorbed from other gases, a vacuum extractor, means for conveying liquid from the absorber to the extractor, means to heat the liquid after it leaves the absorber and before it leaves the vacuum extractor, means to maintain a partial vacuum in said extractor, a douche tank to which gas from the extractor passes, means to convey part of the solution from the absorbers to the douche tank to cool the gas and precipitate moisture therefrom, and means to convey such solution from the douche tank to the extractor.

19. Apparatus for segregating and removing gases from other gases associated therewith, comprising in combination means for subjecting the associated gases to contact with a liquid whereby the gas to be recovered will be absorbed from the gases, a storage tank to collect the solution from the absorber, a vacuum extractor, a heater through which part of the solutions pass from the storage tank to the extractor, a douche tank to which gases from the extractor pass, means connecting the storage tank and the douche tank to supply solution from the storage tank to the douche tank without passing through the heater, and means to convey the solution from the douche tank to the heater without passing through the storage tank.

20. Apparatus for segregating and recovering gases from other gases associated therewith, comprising in combination means for subjecting the associated gases to contact with a liquid whereby the gas to be recovered will be absorbed from other gases, a vacuum extractor, means for conveying the liquid from the absorber to the extractor, means to heat the liquid after it leaves the absorber and before it leaves the vacuum extractor, a douche tank to which a gas from the extractor passes, means to supply liquid to the douche tank to cool the gas and precipitate moisture therefrom, and a refrigerator to which the gas from the douche tank passes.

21. Apparatus for segregating and recovering gases from other gases associated therewith, comprising in combination means for subjecting the associated gases to contact with a liquid whereby the gas to be recovered will be absorbed from other gases, a vacuum extractor, means for conveying the liquid from the absorber to the extractor, means to heat the liquid after it leaves the absorber and before it leaves the vacuum extractor, a douche tank to which a gas from the extractor passes, means to supply liquid to the douche tank to cool the gas and precipitate moisture therefrom, a refrigerator to which the gas from the douche tank passes, and means for conveying the gas from the extractor through the douche tank and the refrigerator under less than atmospheric pressure.

22. Apparatus for segregating and recovering gases from other gases associated therewith, comprising in combination means for subjecting the associated gases to contact with a liquid whereby the gas to be recovered will be absorbed from other gases, a vacuum extractor, means to heat the liquid after it leaves the absorber and before it leaves the vacuum extractor, a douche tank to which a gas from the extractor passes, means to supply liquid to the douche tank to cool the gas and precipitate moisture therefrom, a refrigerator to which the gas from the douche tank passes, and a desiccator containing a supply of a liquid agent having an affinity for water vapor, to which the gas from the refrigerator passes.

23. Apparatus for segregating and recovering gases from other gases associated therewith, comprising in combination means for subjecting the associated gases to contact with a liquid whereby the gas to be recovered will be absorbed from other gases, a vacuum extractor, means to heat the liquid after it leaves the absorber and before it leaves the vacuum extractor, a douche tank to which a gas from the extractor passes, means to supply liquid to the douche tank to cool the gas and precipitate moisture therefrom, a refrigerator to which the gas from the douche tank passes, a desiccator containing a supply of a liquid agent having an affinity for water vapor to which the gas from the refrigerator passes, and means for conveying the gas from the extractor through the douche tank, the refrigerator, and the desiccator, under less than atmospheric pressure.

Signed by me at Quebec, Canada, this 14th day of December, 1917.

FREDERIC AUGUSTUS EUSTIS.